United States Patent
Barnes et al.

(10) Patent No.: US 9,838,745 B2
(45) Date of Patent: Dec. 5, 2017

(54) PROVIDING PRODUCT INFORMATION DURING MULTIMEDIA PROGRAMS

(75) Inventors: Bruce Barnes, Pingree Grove, IL (US); Wayne Robert Heinmiller, Elgin, IL (US); Patrick J. Kenny, Barrington, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 612 days.

(21) Appl. No.: 12/332,741

(22) Filed: Dec. 11, 2008

(65) Prior Publication Data

US 2010/0153226 A1    Jun. 17, 2010

(51) Int. Cl.
| | |
|---|---|
| G06Q 30/00 | (2012.01) |
| H04N 21/478 | (2011.01) |
| G06Q 30/06 | (2012.01) |
| G06Q 30/02 | (2012.01) |
| G06Q 30/04 | (2012.01) |

(52) U.S. Cl.
CPC ....... H04N 21/47815 (2013.01); G06Q 30/02 (2013.01); G06Q 30/04 (2013.01); G06Q 30/06 (2013.01); G06Q 30/0601 (2013.01); G06Q 30/0641 (2013.01)

(58) Field of Classification Search
CPC .......... G06Q 30/0601–30/0643; G06Q 30/06; G06Q 30/08; H04N 21/47815
USPC ........................................................ 705/26
See application file for complete search history.

(56) References Cited

U.S. PATENT DOCUMENTS

| | | | |
|---|---|---|---|
| 5,065,345 A | | 11/1991 | Knowles et al. |
| 5,109,482 A | | 4/1992 | Bohrman |
| 5,204,947 A | | 4/1993 | Bernstein et al. |
| 5,438,355 A | * | 8/1995 | Palmer .................... 725/110 |
| 5,539,871 A | | 7/1996 | Gibson |
| 5,561,708 A | | 10/1996 | Remillard |
| 5,596,705 A | | 1/1997 | Reimer et al. |
| 5,708,845 A | * | 1/1998 | Wistendahl et al. .......... 715/202 |
| 5,790,677 A | * | 8/1998 | Fox ..................... G06Q 20/00 380/277 |
| 5,872,589 A | * | 2/1999 | Morales .................... 725/24 |
| 5,903,816 A | * | 5/1999 | Broadwin et al. ............. 725/110 |
| 5,929,850 A | * | 7/1999 | Broadwin et al. ............. 725/110 |
| 5,961,603 A | * | 10/1999 | Kunkel et al. ................ 709/229 |
| 5,973,685 A | | 10/1999 | Schaffa et al. |
| 6,005,561 A | * | 12/1999 | Hawkins et al. ............. 715/234 |
| 6,016,141 A | * | 1/2000 | Knudson et al. ............. 715/721 |
| 6,215,417 B1 | | 4/2001 | Krass et al. |
| 6,253,193 B1 | * | 6/2001 | Ginter et al. .................... 705/57 |
| 6,275,989 B1 | * | 8/2001 | Broadwin et al. ............... 725/37 |
| 6,445,306 B1 | * | 9/2002 | Trovato et al. .......... 340/825.24 |
| 6,490,580 B1 | | 12/2002 | Dey et al. |
| 6,496,981 B1 | * | 12/2002 | Wistendahl et al. .......... 725/112 |

(Continued)

*Primary Examiner* — William J Allen
(74) *Attorney, Agent, or Firm* — Jackson Walker, L.L.P.

(57) ABSTRACT

A method and system provides information and purchasing services for products placed in multimedia content. Product metadata coordinated in time with the multimedia content may be used to determine the product and obtain product information. A user may send a notification at a time when the product occurs in the multimedia content, and the time may be used to coordinate the product metadata. Product information may be provided to the user. The user may be given the option to purchase the product. Validation of the user may occur in order to authorize the purchase.

16 Claims, 5 Drawing Sheets

(56) References Cited

U.S. PATENT DOCUMENTS

| | | | |
|---|---|---|---|
| 6,505,348 B1* | 1/2003 | Knowles et al. | 725/49 |
| 6,587,835 B1* | 7/2003 | Treyz et al. | 705/14.64 |
| 6,615,408 B1* | 9/2003 | Kaiser et al. | 725/112 |
| 6,637,029 B1* | 10/2003 | Maissel et al. | 725/46 |
| 6,718,551 B1* | 4/2004 | Swix et al. | 725/32 |
| 6,788,800 B1 | 9/2004 | Carr et al. | |
| 7,142,198 B2 | 11/2006 | Lee | |
| 7,343,617 B1* | 3/2008 | Katcher et al. | 725/61 |
| 7,367,042 B1* | 4/2008 | Dakss et al. | 725/60 |
| 7,450,163 B2* | 11/2008 | Rothschild | 348/231.2 |
| 7,454,380 B2* | 11/2008 | Garahi et al. | 705/37 |
| 7,456,872 B2* | 11/2008 | Rothschild | 348/231.99 |
| 7,503,059 B1 | 3/2009 | Rothschild | |
| 7,692,580 B2* | 4/2010 | Rothschild | 342/357.31 |
| 7,896,242 B2* | 3/2011 | Rothschild | 235/383 |
| 7,917,285 B2* | 3/2011 | Rothschild | 701/420 |
| 8,739,236 B1 | 5/2014 | Weaver | |
| 2002/0069415 A1 | 6/2002 | Humbard et al. | |
| 2002/0083451 A1* | 6/2002 | Gill et al. | 725/46 |
| 2002/0162118 A1 | 10/2002 | Levy et al. | |
| 2003/0014754 A1 | 1/2003 | Chang | |
| 2003/0101100 A1* | 5/2003 | Sako et al. | 705/26 |
| 2004/0109087 A1 | 6/2004 | Robinson et al. | |
| 2004/0177008 A1* | 9/2004 | Yang | 705/26 |
| 2004/0215526 A1* | 10/2004 | Luo et al. | 705/26 |
| 2005/0086682 A1 | 4/2005 | Burges et al. | |
| 2005/0114149 A1* | 5/2005 | Rodriguez et al. | 705/1 |
| 2005/0132420 A1 | 6/2005 | Howard et al. | |
| 2005/0137958 A1 | 6/2005 | Huber | |
| 2005/0160469 A1 | 7/2005 | Chiu et al. | |
| 2005/0251732 A1 | 11/2005 | Lamkin et al. | |
| 2005/0289050 A1 | 12/2005 | Narayanan et al. | |
| 2006/0004778 A1 | 1/2006 | Lamkin et al. | |
| 2006/0100951 A1* | 5/2006 | Mylet et al. | 705/37 |
| 2006/0114337 A1* | 6/2006 | Rothschild | 348/231.3 |
| 2006/0114338 A1* | 6/2006 | Rothschild | 348/231.99 |
| 2006/0114514 A1* | 6/2006 | Rothschild | 358/3.28 |
| 2006/0259930 A1* | 11/2006 | Rothschild | 725/81 |
| 2006/0277316 A1 | 12/2006 | Wang et al. | |
| 2007/0022465 A1* | 1/2007 | Rothschild | 725/136 |
| 2007/0045405 A1* | 3/2007 | Rothschild | 235/380 |
| 2007/0052585 A1* | 3/2007 | Rothschild | 342/357.13 |
| 2007/0078732 A1* | 4/2007 | Crolley et al. | 705/27 |
| 2007/0143775 A1* | 6/2007 | Savoor et al. | 725/1 |
| 2007/0150375 A1* | 6/2007 | Yang | 705/26 |
| 2007/0244750 A1* | 10/2007 | Grannan et al. | 705/14 |
| 2007/0252689 A1* | 11/2007 | Rothschild | 340/539.13 |
| 2007/0265006 A1* | 11/2007 | Washok et al. | 455/435.1 |
| 2008/0004978 A1* | 1/2008 | Rothschild | 705/26 |
| 2008/0040767 A1* | 2/2008 | McCarthy | H04N 7/17318 725/132 |
| 2008/0109841 A1* | 5/2008 | Heather | G06Q 30/02 725/32 |
| 2008/0126809 A1* | 5/2008 | Rothschild | 713/186 |
| 2008/0148317 A1* | 6/2008 | Opaluch | 725/46 |
| 2008/0178245 A1* | 7/2008 | Moons | H04N 7/17318 725/118 |
| 2008/0263602 A1* | 10/2008 | Murray et al. | 725/87 |
| 2008/0271088 A1* | 10/2008 | Robinson et al. | 725/61 |
| 2008/0281684 A1* | 11/2008 | Stefanik et al. | 705/14 |
| 2009/0037949 A1* | 2/2009 | Birch | 725/34 |
| 2009/0094104 A1* | 4/2009 | Anuar | 705/14 |
| 2009/0150257 A1* | 6/2009 | Abrams et al. | 705/27 |
| 2009/0192903 A1* | 7/2009 | Weiss et al. | 705/17 |

* cited by examiner

PROVIDING PRODUCT INFORMATION DURING MULTIMEDIA PROGRAMS

BACKGROUND

Field of the Disclosure

The present disclosure relates to providing product information and, more particularly, to providing product information during multimedia programs.

Description of the Related Art

Commercially available products may be displayed or mentioned in multimedia programs. While viewing or listening to multimedia programs, consumers may become aware of a product of interest to them.

DESCRIPTION OF EXEMPLARY EMBODIMENTS

Figure 1:
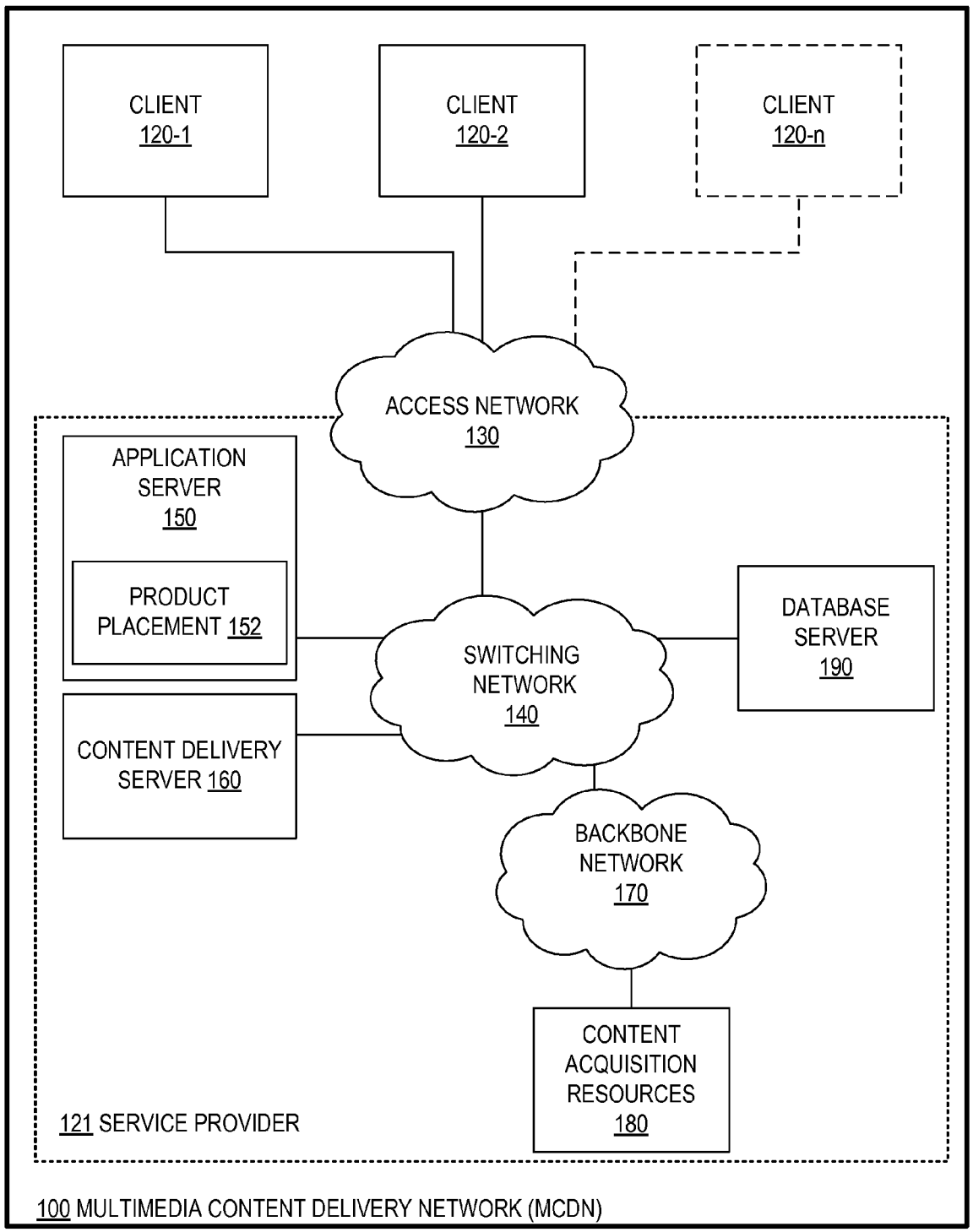
FIG. 1 is a block diagram of selected elements of an embodiment of a multimedia distribution network.

In one aspect, a disclosed method for providing product information over a multimedia content distribution network (MCDN) includes receiving multimedia content from the MCDN, including receiving product metadata coordinated in time with the multimedia content. Responsive to receiving a user notification at or proximate to a time when a placed product occurs in the multimedia content, the method may further include determining coordinated product metadata for the placed product based on the time, and using the coordinated product metadata to obtain product information for the placed product.

In some embodiments, the method may further include outputting product information for the placed product to the user. The product information may include information from a vendor of the placed product. The method may further include outputting to the user a list of placed products occurring in the multimedia content when the user notification is received, and receiving a command from the user indicating selection of one of the placed products on the list.

In some instances, the method may still further include receiving a request from the user to purchase the placed product. The method may also include validating the identity of the user. Validating the identity of the user may include determining the global-positioning system (GPS) location of a wireless telephony device registered to the user. In some cases, validating the identity of the user may include determining the network identity of a multimedia handling device (MHD) registered to the user, while the MHD may be used for said receiving and said outputting of the multimedia content.

In another aspect, a disclosed system for accessing product information over an MCDN includes a processor, and storage accessible to the processor, including processor executable instructions. The instructions may be executable to decode multimedia content received from the MCDN, wherein product metadata coordinated in time with the multimedia content is also received from the MCDN, and respond to receiving a user alert indicating product interest at a time when a placed product occurs in the multimedia content by determining the placed product from the coordinated product metadata. The instructions may further be executable to associate the user alert with the placed product.

In one embodiment, the system further includes instructions executable to respond to said instructions to associate by obtaining product information for the placed product. The instructions may further be executable to output the product information to a display and respond to receiving a command from the user to purchase the placed product by initiating a purchase of the placed product. The instructions may still further be executable to apply a charge for the price of the placed product and cause the placed product to be delivered to the user. An MHD registered to the user under a service contract may be used to execute said instructions to decode multimedia content, while said instructions executable to apply a charge may include program instructions executable to charge a user account according to the service contract.

In some embodiments, the instructions are further executable to validate an identity of the user. The instructions executable to validate may include instructions executable to determine the GPS location of a wireless telephony device registered to the user. The instructions executable to validate may include instructions executable to determine a network identity of the MHD registered to the user.

In yet a further aspect, computer-readable memory media, including processor executable instructions for distributing product information over an MCDN, may include instructions executable to send multimedia content and product metadata coordinated in time with the multimedia content to a client an MHD, and respond to receiving a request for product information, at a time when a placed product occurs in the multimedia content by using the coordinated product metadata to obtain product information for the placed product. The instructions may further be executable to send the product information to the client MHD.

In some embodiments, the instructions are executable to respond to receiving a request to purchase the placed product by causing the placed product to be ordered on behalf of the user. The instructions may further be executable to validate an identity of the user, including obtaining user information from an account for MCDN services. A price of the placed product may be charged to the account for MCDN services. The instructions may still further be executable to charge the user for a price of the placed product and send a receipt for the purchase to the user.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of an MCDN 100. Although multimedia content is not limited to TV, video on demand (VOD), or pay-per-view programs (PPV), the depicted embodiments of MCDN 100 and its capabilities are primarily described herein with reference to these types of multimedia content, which are interchangeably referred to herein as multimedia content, multimedia content program(s), multimedia programs or, simply, programs.

The elements of MCDN 100 illustrated in FIG. 1 depict network embodiments with functionality for delivering multimedia content to a set of one or more users. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different user of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides connection path(s) between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twist pair cables, fiber optic cables, or a combination thereof MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG). Some scheduled programs may be "regularly" scheduled programs, which recur at regular intervals or at the same periodic date and time (i.e., daily, weekly, monthly, etc.).

As will be discussed in detail below, commercially available products may be placed or included in multimedia content provided for consumption by a user of client 120. As used herein, "consumption" refers to viewing, listening, recording, copying, obtaining, selecting, or any other actions associated with receipt of multimedia content by the user. Product information for placed products may be provided to the user in response to receiving a notification of product interest by the user. Furthermore, product metadata coordinated in time with the multimedia content may be used to provide product information for the placed products. Such product information may include specifications, price, availability, warranty, and other related information for the products.

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of multimedia content delivery network 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPG, digital video recording (DVR), VOD, or PPVs, Internet protocol television (IPTV) portal, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include product placement module 152, which, as will be described in detail below, is enabled to provide product information and related services for placed products in multimedia content provided to client 120 of MCDN 100.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as product metadata or product information for placed products, as will be discussed in detail below.

Figure 2:
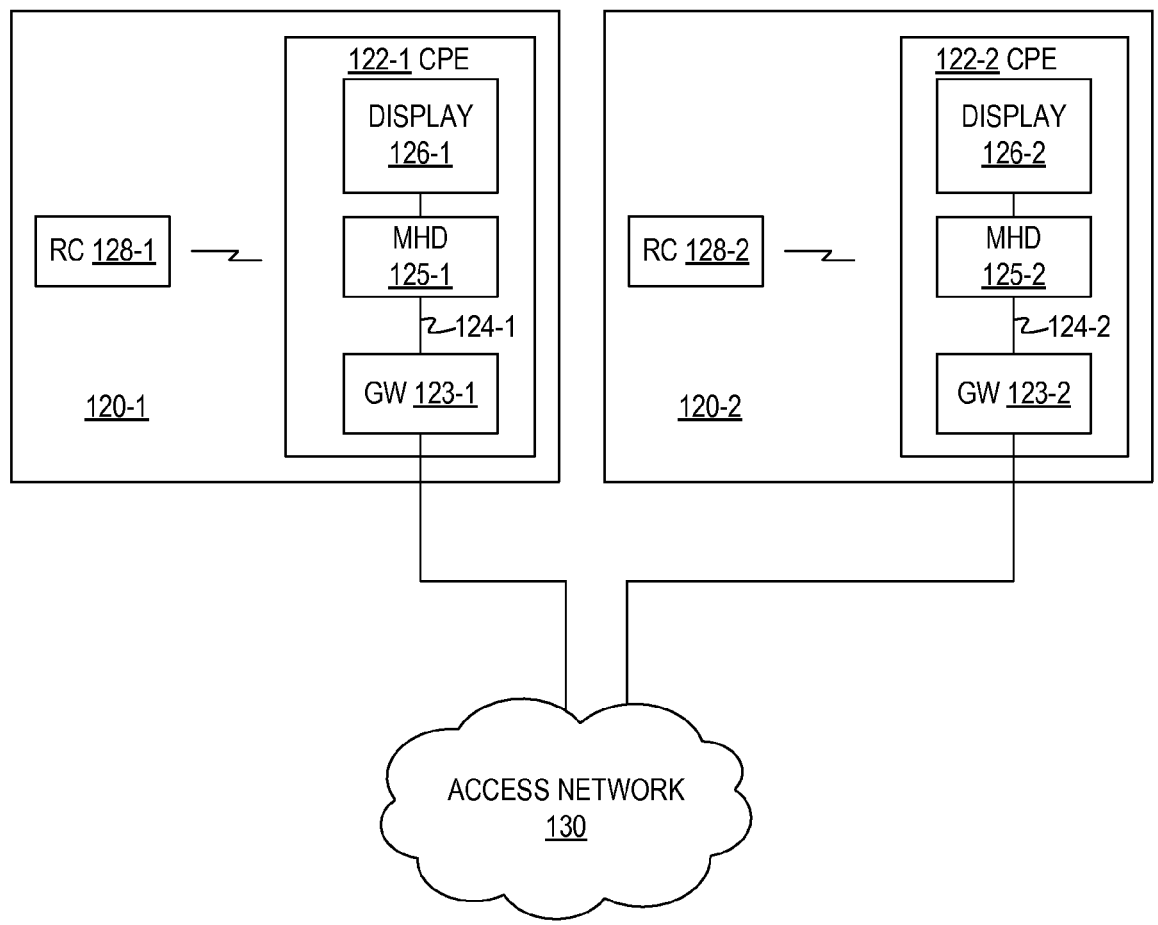
FIG. 2 is a block diagram of selected elements of an embodiment of a multimedia distribution network.

Turning now to FIG. 2, clients 120 are shown in additional detail with respect to access network 130. Clients 120 may include network appliances collectively referred to herein as client premises equipment (CPE) 122. In the depicted embodiment, CPE 122 includes the following devices: gateway (GW) 123, MHD 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated or external speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125.

MHD 125 is enabled and configured to process incoming multimedia signals to produce audio and visual signals suitable for delivery to display 126 and any optional external speakers (not depicted). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a co-axial or IP-based MCDN.

Figure 3:
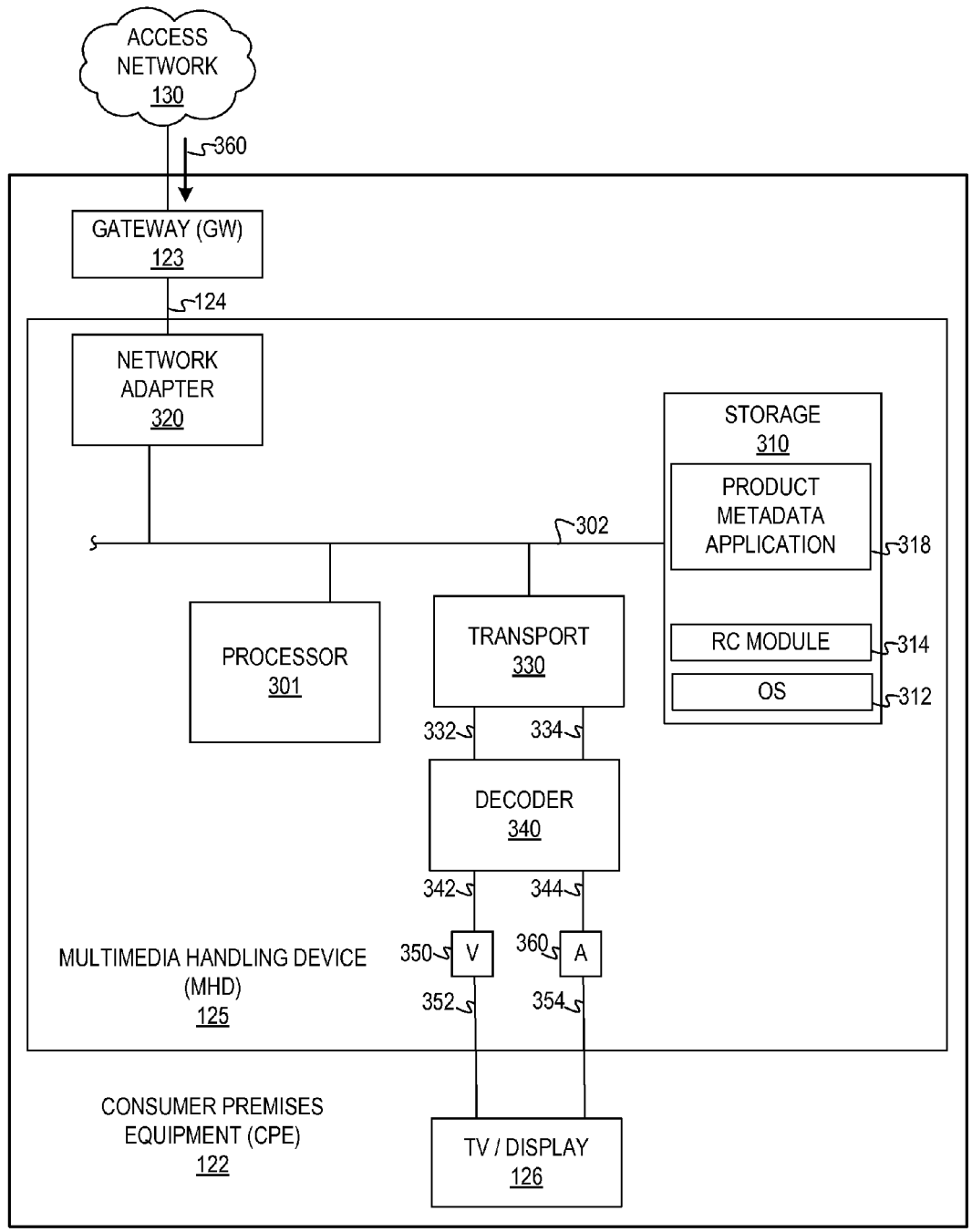
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP based content delivery networks, MHD 125, as depicted in FIG. 3, may include transport unit 330 that assembles the payloads from a sequence or set of network packets into a stream of multimedia content. In coaxial based access networks, content may be delivered as a stream that is not packet based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 360 respectively to produce analog video and audio signals 352 and 354 in a format compliant with display 126, which itself may or may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown includes sets or sequences of instructions, namely, an operating system 312, a remote control (RC) application program identified as RC module 314, and a product metadata application 318. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

Figure 4:
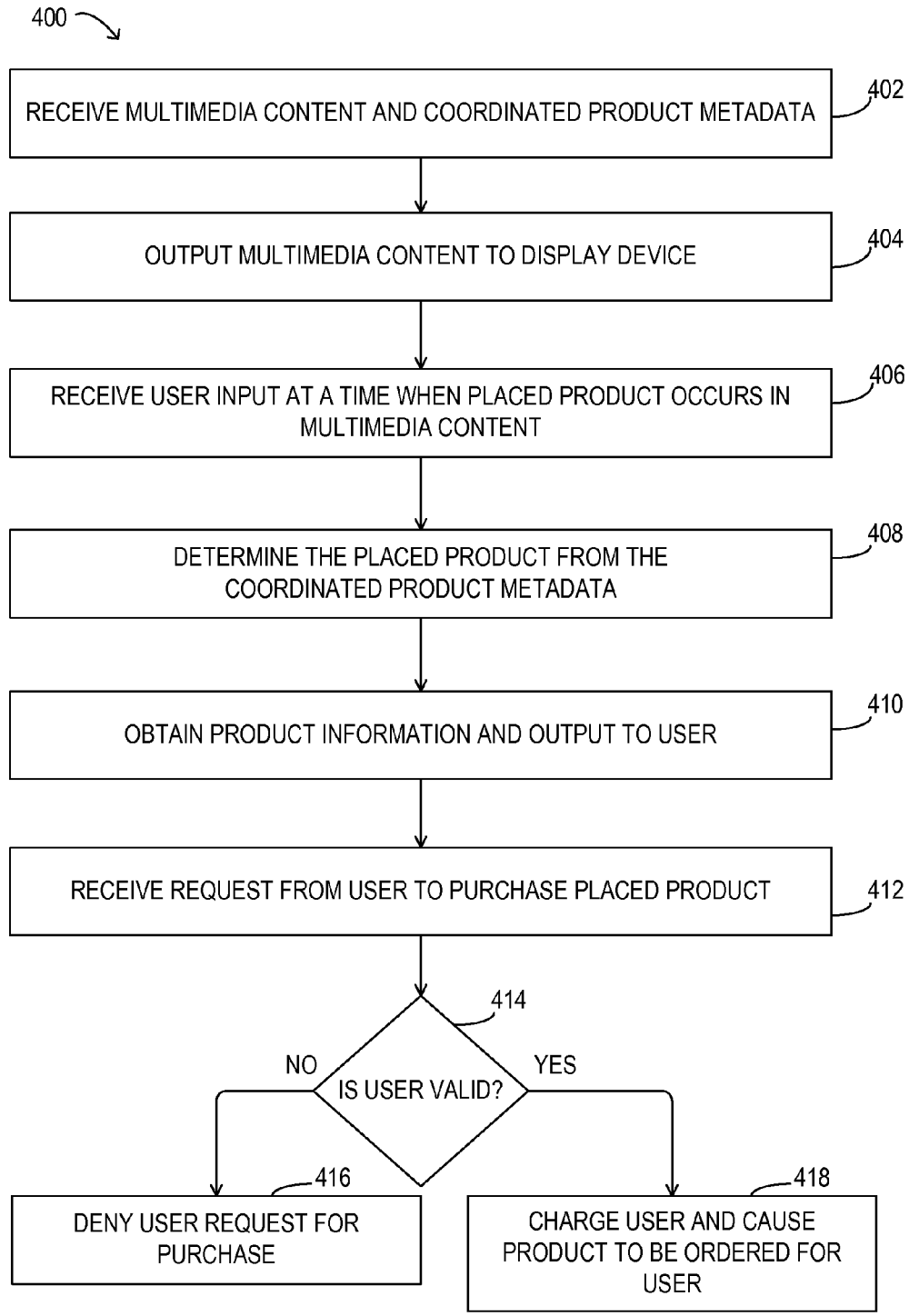
FIG. 4 illustrates an embodiment of a method for providing information for products placed in multimedia content.

Referring now to FIG. 4, an embodiment of method 400 for providing information for products placed in multimedia content is illustrated. In one embodiment, MHD 125, or another device associated with client 120, is configured to execute method 400. In some instances, product metadata application 318 may include program instructions executable to perform at least some operations of method 400. Product metadata application 318 may further include instructions to communicate with remote control 128 using RC module 314 for responding to received commands and notifications (see FIGS. 2-3).

Multimedia content may be received from the MCDN, along with product metadata coordinated in time with the multimedia content (operation 402). The multimedia content may be a video or television program, and the product metadata may be indexed to each frame of the received program. The product metadata may provide an indication of which products occur in the multimedia content, and may be used to obtain additional product information such as specifications, price, availability, warranty, and other related information for the products. The multimedia content may then be output to a display device (operation 404). In some embodiments of operation 404, a video program received via access network 130 is displayed on display 126.

Input from a user receiving the multimedia content may be received at or proximate to a time when the placed product occurs in the multimedia content (operation 406). In some embodiments, the user may use remote control 128 to provide a notification of interest in a placed product. The placed product may be determined from the coordinated product metadata (operation 408). The product metadata may be determined by coordinating the point in time that the user input, such as a user alert, was received in operation 406. In some embodiments, a query to database server 190 is performed to query product metadata. Product information may be obtained and output to the user (operation 410). In some cases product information is displayed to the user on display 126. Outputting product information to the user may further include outputting a list of placed products occurring in the multimedia content at the time a user notification was received. In response to viewing the list, the user may select one or more products from the list for which product information may be provided. The coordinated product metadata may be used to obtain product information, which may include price, availability, specifications, warranty, and other information pertaining to the desired product. In some cases, product information is obtained from a vendor of the placed product in operation 410.

A request may then be received from the user to purchase the placed product (operation 412). A decision may be made whether or not the user is a valid user, or has been validated (operation 414). In one embodiment, validation of the user is performed by determining a GPS location of a wireless telephony device registered to the user. In some cases, user validation is performed by determining the network identity of an MHD registered to the user, such as the MHD used for receiving, decoding, and outputting the multimedia content. If the result of operation 414 is NO, then the user request for purchase may be denied (operation 416). If the result of operation 414 is YES, then the user may be charged for the selected product and method 400 may cause the product to be ordered for the user (operation 418). In one embodiment, the user may be charged for the product on an account for MCDN services, which may be governed by a service contract with the user. In other embodiments, the user may provide applicable payment via other methods such as credit card, direct billing, or the like.

Figure 5:
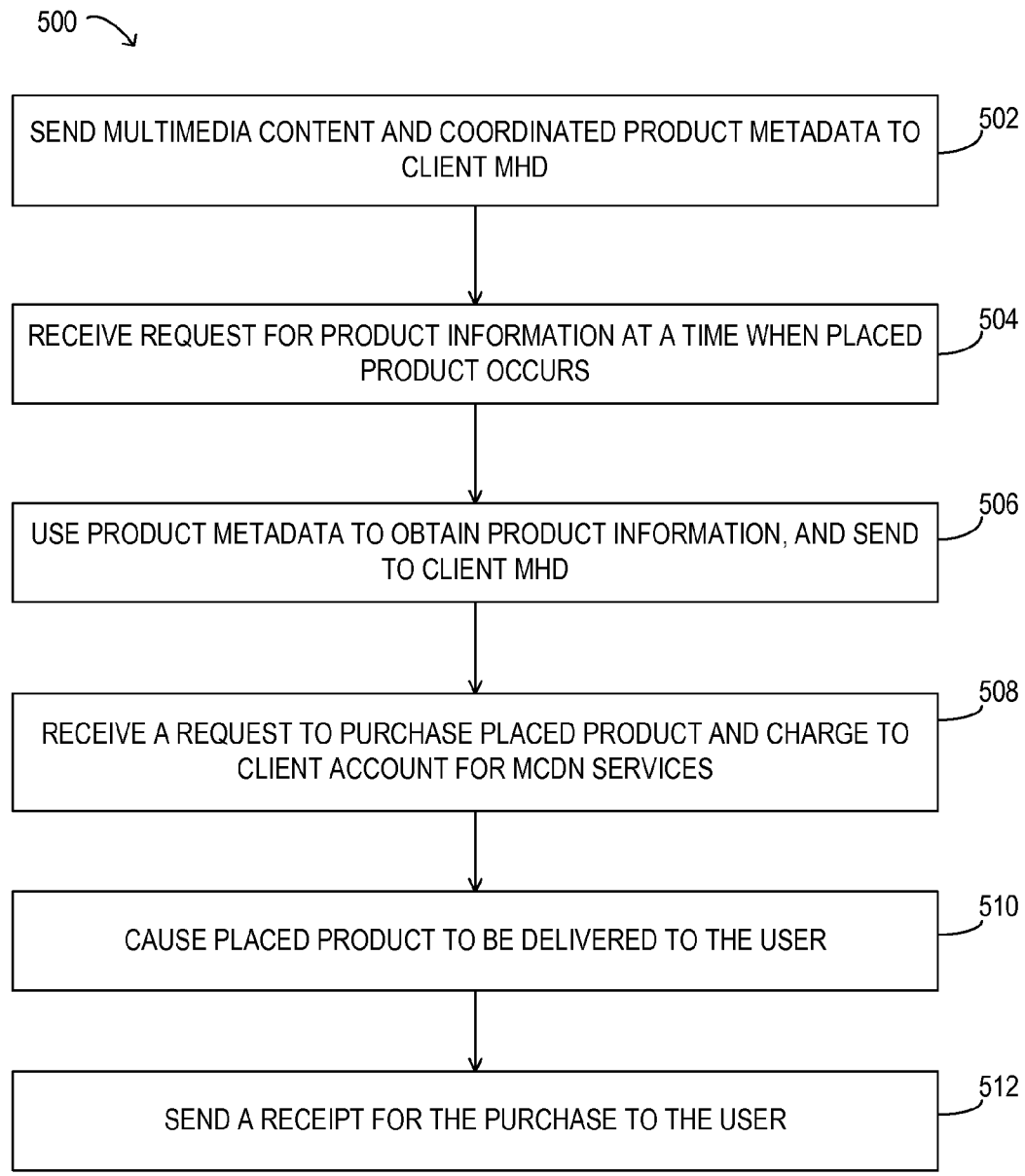
FIG. 5 illustrates an embodiment of a method for providing information for products placed in multimedia content.

Referring now to FIG. 5, an embodiment of method 500 for providing information for products placed in multimedia content is illustrated. In one embodiment, application server 150 is configured to execute method 500. In some cases, product placement module 152 (depicted in FIG. 1) may include program instructions executable to perform at least some operations of method 500. Product placement module 152 may further cooperate with product metadata application 318 (depicted in FIG. 3), described above with respect to method 400 (see FIG. 4), to perform at least some operations of method 500. It is further noted that portions of method 400 and method 500 may be variously combined in different embodiments.

Multimedia content may be sent via the MCDN to a client MHD, along with product metadata coordinated in time with the multimedia content (operation 502). A request for product information may be received at a time when a placed product occurs in the multimedia content (operation 504). The product metadata may be used to obtain product information for the placed product and the product information may be sent to the client MHD (operation 506). In some cases, the point in time of the request may be used to coordinate the product metadata. A request to purchase the placed product may be received and a client account for MCDN services may be charged (operation 508). In some embodiments, an option to separately pay for the desired placed product may be provided. Method 500 may then cause the placed product to be delivered to the user (operation 510). In one embodiment, shipping of a physical product is initiated in operation 510. In some cases, the product may include digital multimedia content, which may be sent to the user using MCDN 100. A receipt for the purchase may be sent to the user (operation 512). The receipt may be a printed hardcopy or may be sent in electronic form.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for providing product information over a multimedia network, the method comprising:

obtaining, by a set top box via an access network coupling the set top box to an application server of a multimedia service provider, a product metadata application;

receiving, via the access network from a content delivery server of the multimedia service provider, streaming content corresponding to a multimedia program, the streaming content including coordinated product metadata indicative of placed products appearing in the multimedia program and coordinated in time with appearances of the placed products in the program;

responsive to receiving a wirelessly transmitted notification from a remote control device at a particular time of the multimedia program, performing, by the set top box, in accordance with instructions of the product metadata application, operations including:

accessing a portion of the coordinated product metadata coordinated with the particular time;

identifying particular placed products corresponding to the portion of the coordinated product metadata;

displaying a list of user selectable items corresponding to the particular placed products;
responsive to detecting, by the set top box, user selection of a particular selectable item corresponding to a particular placed product, validating an identity of the user; and
communicating with the application server of the service provider to purchase the particular placed product, wherein the set top box is registered to the user and wherein said communicating includes communicating a network identity of the set top box to the service provider.

2. The method of claim 1, wherein the product information includes information selected from product specification information, product pricing information, product availability information, and product warranty information.

3. The method of claim 2, wherein receiving the coordinated product metadata includes receiving the coordinated product metadata from a vendor of the placed product.

4. The method of 1, further comprising:
generating a list, suitable for display, of a set of placed products referred to in the multimedia program; and
receiving a command from the remote control device indicating a selected product from the set of placed products.

5. The method of claim 4, further comprising:
receiving a purchase request from the remote control device to purchase the selected product.

6. The method of claim 1, wherein communicating the network identity of the set top box to the serviced provider facilitates validation of the user to the service provider.

7. The method of claim 1, wherein validating the identity of the user includes determining a global-positioning system location of a wireless telephone devices associated with the user.

8. The method of claim 1, further comprising: outputting a placed products list indicative of all placed products appearing in the multimedia content at the time notification is received; and receiving, from the remote control device, a command indicating selection of one of the placed products.

9. A system for accessing product information over a multimedia network, the system comprising:
a processor, having access to a computer readable storage medium, the storage medium including processor executable program instructions that, when executed by the processor, cause the processor to perform operations comprising:
obtaining, by a set top box via an access network coupling the set top box to an application server of a multimedia service provider, a product metadata application;
receiving, via the access network from a content delivery server of the multimedia service provider, streaming content corresponding to a multimedia program, the streaming content including coordinated product metadata indicative of placed products appearing in the multimedia program and coordinated in time with appearances of the placed products in the program; and
responsive to receiving a wirelessly transmitted notification from a remote control device at a particular time of the multimedia program, performing, by the set top box, in accordance with executable instructions of the product metadata application, operations including:
accessing a portion of the coordinated product metadata coordinated with the particular time;
identifying particular placed products corresponding to the portion of the coordinated product metadata;
displaying a list of user selectable items corresponding to the particular placed products;
responsive to detecting, by the set top box, user selection of a particular selectable item corresponding to a particular placed product, validating an identity of the user; and
communicating, by the set top box, with the application server of the service provider to purchase the particular placed product, wherein the set top box is registered to the user and wherein said communicating includes a network identity of the set top box.

10. The system of claim 9, wherein the operations include:
outputting the product information to a display; and
responding to receiving a purchase request from the user by initiating a purchase of the placed product.

11. The system of claim 10, wherein the operations include:
applying a charge for a price of the placed product; and
causing the placed product to be delivered to the user.

12. The system of claim 11, wherein a multimedia handling device associated with the user under a service contract is used to decode the multimedia program, and wherein the instructions to apply a charge include instructions to charge a user account associated with the service contract.

13. A non-transitory computer-readable memory medium, including program instructions, executable by a processor, for distributing product information over a multimedia network, the program instructions including instructions that, when executed by a processor, cause the processor to perform operations comprising:
obtaining, by a set top box via an access network coupling the set top box to an application server of a multimedia service provider, a product metadata application;
receiving, via the access network from a content delivery server of the multimedia service provider, streaming content corresponding to a multimedia program, the streaming content including coordinated product metadata indicative of placed products appearing in the multimedia program and coordinated in time with appearances of the placed products in the program; and
responsive to receiving a wirelessly transmitted notification from a remote control device at a particular time of the multimedia program, performing, by the set top box, in accordance with instructions of the product metadata application, operations including:
accessing a portion of the coordinated product metadata coordinated with the particular time;
identifying particular placed products corresponding to the portion of the coordinated product metadata;
displaying a list of user selectable items corresponding to the particular placed products;
responsive to detecting, by the set top box, user selection of a particular selectable item corresponding to a particular placed product, validating an identity of the user; and
communicating, by the set top box, with the application server of the service provider to purchase the particular placed product, wherein the set top box is registered to the user and wherein said communicating includes a network identity of the set top box.

14. The computer readable medium of claim 13, wherein the operations include:
respond to receiving a request to purchase the placed product by causing the placed product to be ordered on behalf of the user.

15. The computer readable medium of claim 13, wherein a price of the placed product is charged to the account for multimedia network services.

16. The computer readable medium of claim 13, wherein the operations include:
- charge the user for a price of the placed product; and
- send a receipt for the placed product to the user.

\* \* \* \* \*